United States Patent [19]
Rupp, II

[11] 3,733,919
[45] May 22, 1973

[54] ADJUSTABLE ECCENTRIC BEARING MOUNTINGS

[75] Inventor: Herbert E. Rupp, II, Mansfield, Ohio

[73] Assignee: Rupp Industries, Inc., Mansfield, Ohio

[22] Filed: Sept. 20, 1971

[21] Appl. No.: 181,724

[52] U.S. Cl. ............................................... 74/242.16
[51] Int. Cl. .................................................. F16h 7/10
[58] Field of Search ................... 74/242.16; 308/61, 308/62

[56] References Cited
UNITED STATES PATENTS

| | | | |
|---|---|---|---|
| 953,216 | 3/1910 | Mix | ........................................308/62 |
| 2,651,239 | 9/1953 | Schlagel | ........................74/242.16 X |
| 3,626,772 | 12/1971 | Gutzmer | ........................74/242.16 X |

*Primary Examiner*—Milton Kaufman
*Assistant Examiner*—Frank H. McKenzie, Jr.
*Attorney*—Blythe D. Watts, James T. Hoffman, Thomas E. Fisher et al.

[57] ABSTRACT

A device for laterally shifting one shaft relative to another shaft which includes two separate, axially spaced, eccentric bearing mountings, means interconnecting those two mountings for simultaneous adjusting rotation and means for clamping those mountings in adjusted position.

5 Claims, 4 Drawing Figures

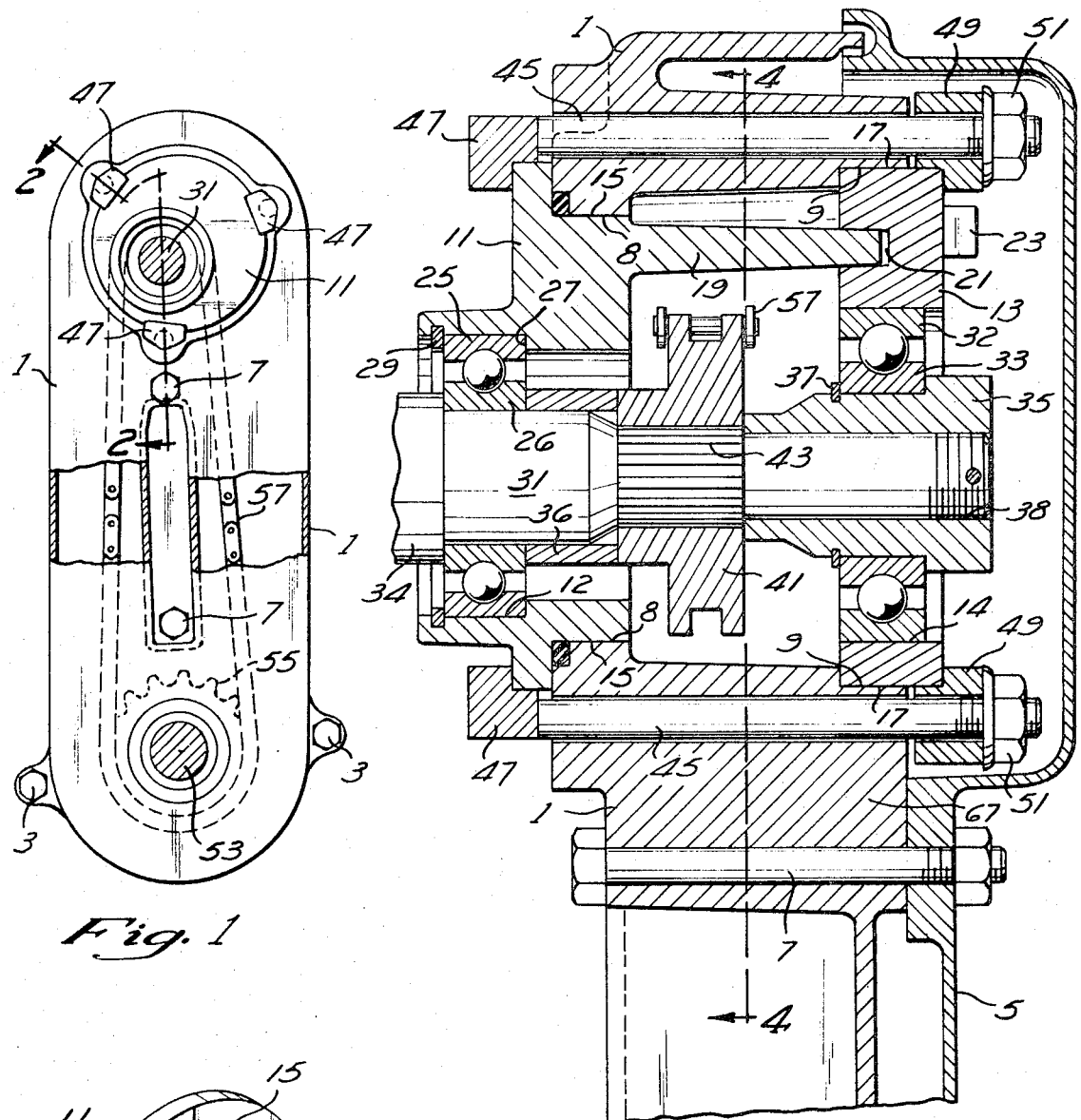
Fig. 1
Fig. 2
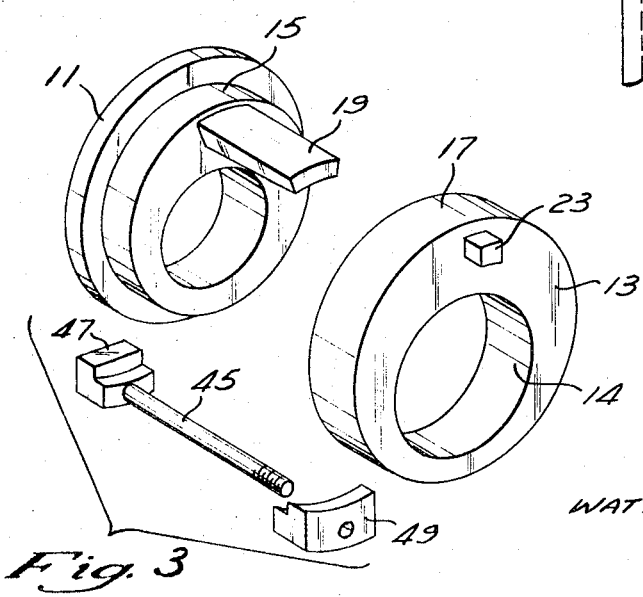
Fig. 3
INVENTOR.
HERBERT E. RUPP, II
BY
WATTS, HOFFMANN, FISHER & HEINKE
ATTORNEYS

ADJUSTABLE ECCENTRIC BEARING MOUNTINGS

BACKGROUND

The prior art includes many instances of eccentric bearing mountings. Two patents which I believe are fairly illustrative of the prior art are U.S. Pat. Nos. 1,171,347 and 2,427,470. I am not aware of any other prior art which shows structures more nearly pertinent to the present invention than do those patents.

SUMMARY

The present invention comprises a device for laterally shifting one shaft relative to another shaft to vary the tension or tightness of motion transmission means connecting said shafts. The device includes a housing or case, and a bearing assembly.

The bearing assembly includes a plurality of axially spaced shaft bearings, two axially spaced, separate, eccentric units in which the shaft bearings are positioned and which interengage with one another for simultaneous adjusting rotary motion to vary the position of one shaft relative to the other shaft, and means for fixing the said units in adjusted position. The housing or case carries the bearing assembly, another driven shaft, and chain connecting sprockets on the two shafts. The tension on the chain may be adjusted by moving the drive shaft laterally relative to the driven shaft, which may be done by loosening and rotating one eccentric bearing member and thereby shifting the centerline of the drive shaft laterally relative to the centerline of the driven shaft and then securing the bearing members in the adjusted position.

BRIEF DESCRIPTION OF THE DRAWINGS

A preferred form of the present invention is shown in the accompanying drawings in which:

FIG. 1 is a vertical, elevational view, partly in section, of a device embodying the present invention;

FIG. 2 is a vertical, sectional view, taken on line 2—2 of FIG. 1;

FIG. 3 is an exploded perspective view showing the bearing mountings and means for clamping them against movement from an adjusted position.

Figure 4:
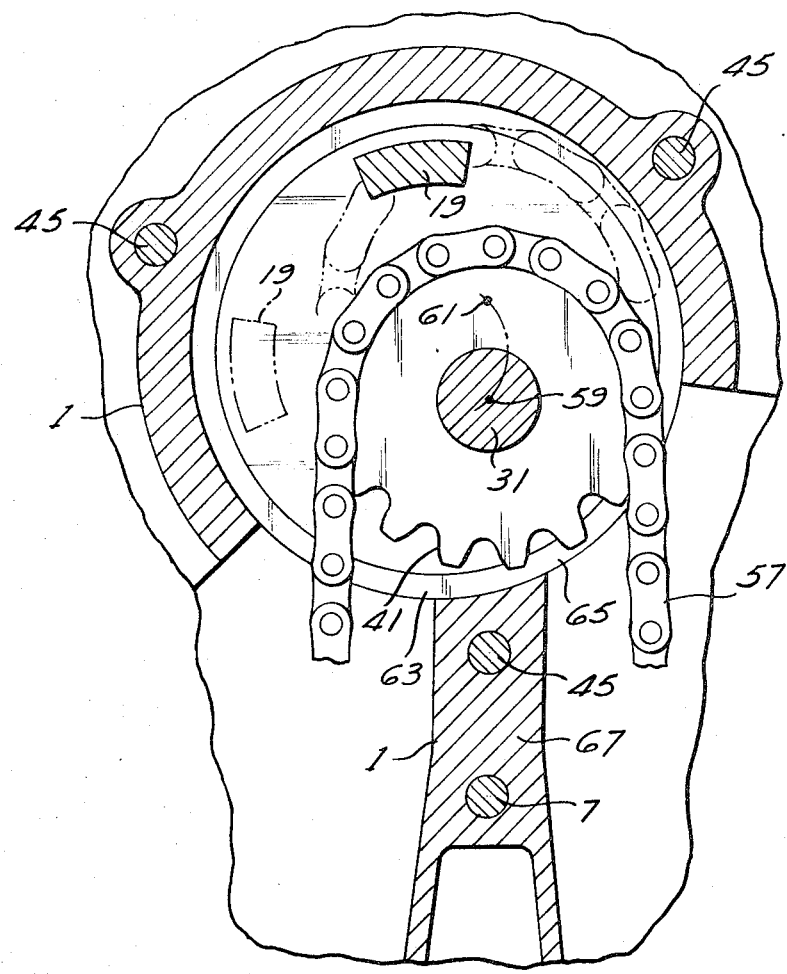
FIG. 4 is a fragmentary, cross sectional view taken on line 4—4 of FIG. 2.

The embodiment of the present invention which is illustrated in FIGS. 1–4 comprises a housing or case 1 which is securable to the frame of a snowmobile (not shown) as by bolts 3, and a front cover 5 which is attached to the housing 1 as by bolts 7.

The housing or case 1 is provided, near one end thereof, with an opening partly defined by axially spaced inner cylindrical surfaces 8 and 9 and within which a bearing assembly is positioned. That assembly includes bearing mountings, bearings, a shaft and means for transmitting rotary motion of the shaft. The mountings 11 and 13 are positioned with their outer cylindrical surfaces 15 and 17, respectively, engaging the inner cylindrical surfaces 8 and 9 of the housing and have axially spaced cylindrical inner bearing-receiving surfaces 12 and 14 disposed eccentrically with respect to surfaces 15 and 17. Mounting 11 is provided with a tang 19 which extends to mounting 13 and seats in a recess 21 in the inner face thereof. A lug 23 projecting from the face of mounting 13 serves as a means for adjustably rotating the mountings 11 and 13.

Mounting 11 is provided with a ball bearing which includes an outer ring 25 and an inner ring 26. Ring 25 is seated on surface 12 of the mounting and is retained between a shoulder 27 on the mounting and ring 29 which is seated in a groove in the mounting.

Mounting 13 is provided with a ball bearing which includes an outer ring 32 and an inner ring 33. The outer ring is seated on surface 14 of mounting 13. Inner ring 33 is seated on sleeve 35 between a shoulder thereon engaging the outer end of the ring and a ring 37 engaging the inner end and seated in a groove in sleeve 35.

Shaft 31 extends through bearing 25 and into and nearly through sleeve 35. A shoulder 34 on shaft 31 bears against the outer end of inner ring 26. A spacer 36 is seated on shaft 31 and bears against the inner end of ring 26. A chain sprocket 41 is carried by shaft 31 between mountings 11 and 13 and is connected to shaft 31 by interengaging splines 43. The sprocket bears against the inner ends of sleeve 35 and spacer 36. Sleeve 35 has screw-threaded engagement with shaft 31, as indicated at 38.

The bearing assembly is secured in position in the opening in housing 1 in any suitable manner, as by bolts 45 having heads 47, lugs 49 and nuts 51. The bolt heads 47 and lugs 49 engage the outer sides of the mountings 11 and 13 and clamp them against the surrounding part of the housing or case 1.

Remote from the bearing assembly, the housing 1 is provided with a second or driven shaft 53 which carries a chain sprocket 55. Chain 57 extends around sprockets 41 and 55 and serves to transmit rotary motion from the drive shaft to the driven shaft.

The present invention provides means for taking up slack or varying the tension in the chain belt 57 as is indicated in FIG. 4. As is there indicated diagrammatically, the longitudinal centerline or axis of the shaft 31 may be moved transversely in an arc of about 90° in length. This movement is accomplished by rotating the eccentric bearing mountings 11 and 13 on the cylindrical inner surfaces 8 and 9 of the housing, as may be done by loosening nuts 51 on bolts 45 and then rotating mounting 13 by moving lug 23. Mounting 11 will be correspondingly rotated by reason of the tang engagement in recess 21. Since the centerline of the shaft 31 is positioned eccentrically in the mountings 11 and 13, rotation of those mountings will shift the centerline of the shaft 31 to any position between points 59 and 61. As the centerline of shaft 31 is so moved from position 59 toward position 61, the tension on the chain belt 57 will be increased or, in other words, the slack in the chain will be decreased. When the mountings 11 and 13 are rotated in the opposite direction, the centerline will be moved from point 61 toward 59, thereby increasing the slack or decreasing the tension in the chain belt.

It will be noted, by referring to FIG. 4, that the housing is cut away, as at 63 and 65, to provide space for the chain 57. The portion 67 of housing 1 which separates these two spaces is wide enough to carry one of the three clamping bolts 45 and one of the two bolts 7 which secure the cover 5 to the housing.

It will be understood that the parts of the illustrated device may be readily assembled and disassembled. With the shaft 53 and sprocket 55 in position, the chain 57 may be engaged with the sprocket 55 and passed into openings 63 and 65. Then the assembly may be moved endwise into the housing and the belt may be engaged with the sprocket 41.

It is to be understood that the present invention is not restricted to use with snowmobiles but may be used wherever it is desirable to move a shaft in a direction transverse to its longitudinal axis. Furthermore, the bearing assembly is of general utility and may be used with a variety of carrying cases, housings or other supports.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. In a transmission, a device for shifting one rotatable shaft transversely of its longitudinal axis relative to another rotatable shaft comprising a housing having a hollow portion partly defined by opposed side walls, opposed openings in said walls having axially spaced, inner, cylindrical, coaxial surfaces, axially spaced bearing mountings in said openings and having outer, cylindrical, coaxial surfaces seating on said inner cylindrical surfaces, said mountings being rotatably adjustable in said openings and having axially spaced, inner, coaxial, cylindrical surfaces eccentric to said outer cylindrical surfaces, shaft bearings in said mountings, and means engaging said mountings and clamping them in adjusted position in the housing.

2. The combination of elements set forth in claim 1 in which a first shaft is positioned in the shaft bearings, a second shaft is positioned in the housing remote from said first shaft and means is provided for transmitting of rotary motion from said first shaft to said second shaft.

3. The combination of elements set forth in claim 1 in which a first shaft is positioned in the shaft bearings and carries a chain sprocket between said mountings, a second shaft is positioned in the housing remote from the first shaft and carries a chain sprocket and a chain belt engages said sprockets for transmitting rotary motion from one shaft to the other.

4. The combination of elements set forth in claim 1 in which said mountings have interengaging means for transmitting rotary adjusting motion from one mounting to the other.

5. The combination of elements set forth in claim 1 in which one mounting has a tang extending therefrom to and engaging in a recess in the other mounting for transmitting rotary adjusting motion from one mounting to the other.

* * * * *